United States Patent [19]
Satoh et al.

[11] Patent Number: 5,708,863
[45] Date of Patent: Jan. 13, 1998

[54] IMAGE BLUR PREVENTION DEVICE FOR CAMERA

[75] Inventors: Tatsuya Satoh, Hachioji; Tsuyoshi Yaji, Kawagoe, both of Japan

[73] Assignee: Olympus Optical Co., Ltd., Tokyo, Japan

[21] Appl. No.: 745,818

[22] Filed: Nov. 12, 1996

[30] Foreign Application Priority Data

Nov. 16, 1995 [JP] Japan .................... 7-298390

[51] Int. Cl.$^6$ .................................... G03B 17/00
[52] U.S. Cl. ................................. 396/52; 396/53
[58] Field of Search ........................... 396/52, 53, 54, 396/55

[56] References Cited

U.S. PATENT DOCUMENTS

| | | | |
|---|---|---|---|
| 5,150,150 | 9/1992 | Enomoto | 396/53 |
| 5,237,365 | 8/1993 | Miyazawa | 396/55 |
| 5,307,113 | 4/1994 | Egawa | 396/54 |

FOREIGN PATENT DOCUMENTS

| | | |
|---|---|---|
| 63-53531 | 3/1988 | Japan . |
| 3-92830 | 4/1991 | Japan . |

Primary Examiner—Russell E. Adams
Attorney, Agent, or Firm—Frishauf, Holtz, Goodman, Langer & Chick

[57] ABSTRACT

In an image blur prevention device for a camera, the limit delay time for image blur reduction is set to be changeable so as to reduce the influences of camera shakes on photographing operations, so as to realize high operability. A shake determining section determines the image blur state on the current image plane on the basis of the camera shake state detected by a shake detecting section. As a result, information corresponding to the level of the current image blur state is sent to an exposure control section. On the basis of image blur state information from the shake determining section when an exposure start instruction signal is received, limit delay time information set in a limit delay time setting section, and the count result obtained by a timer section, the exposure control section determines whether to start an exposure operation in accordance with the state of a release operating section. If it is determined that exposure should be started, a shutter unit is driven by a shutter drive section to perform an exposure operation. If it is determined that exposure should not be started, the shutter drive section is stopped, and no exposure operation is performed.

29 Claims, 9 Drawing Sheets

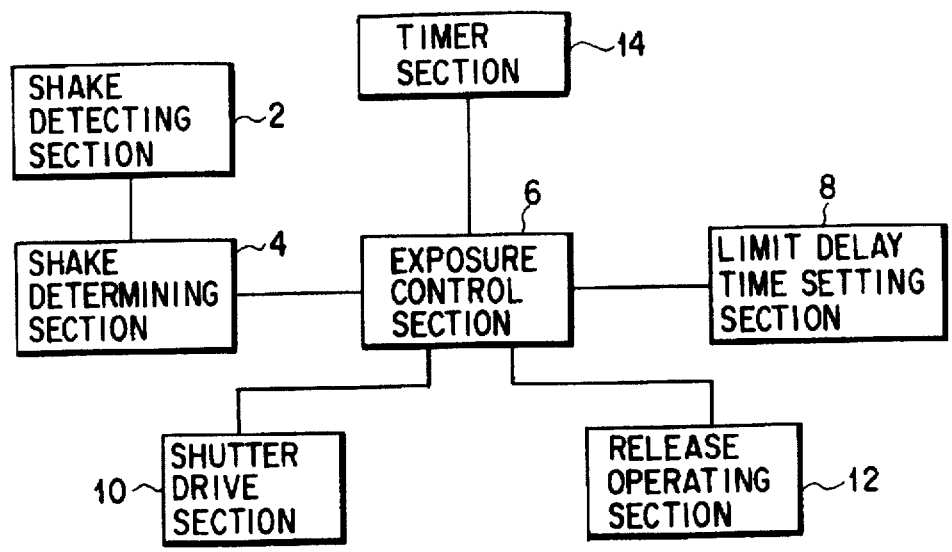
F I G. 1
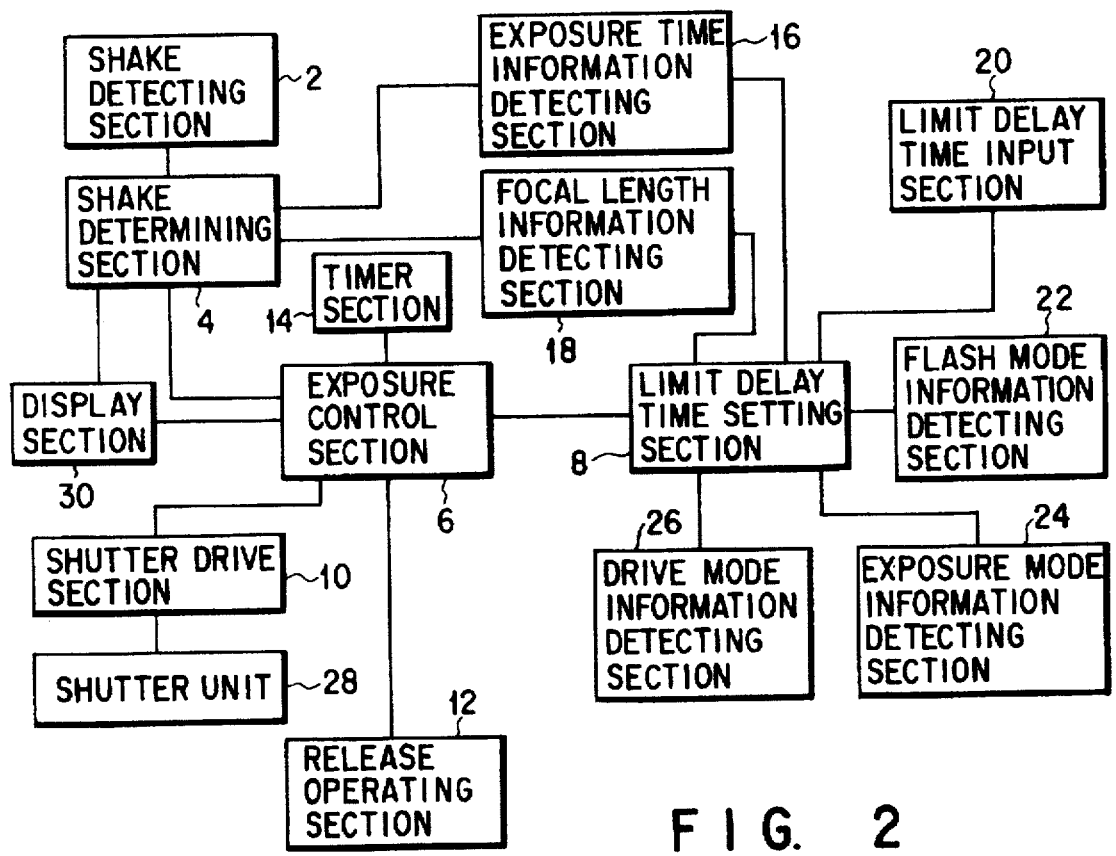
F I G. 2

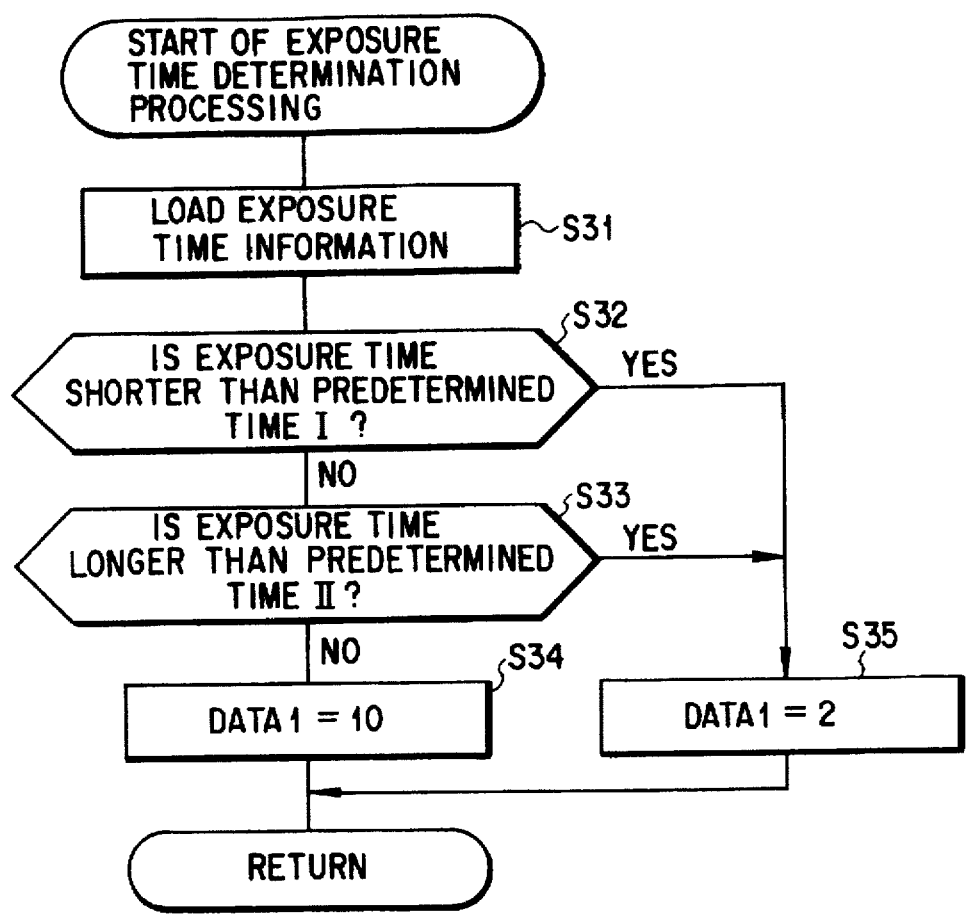
F I G. 6
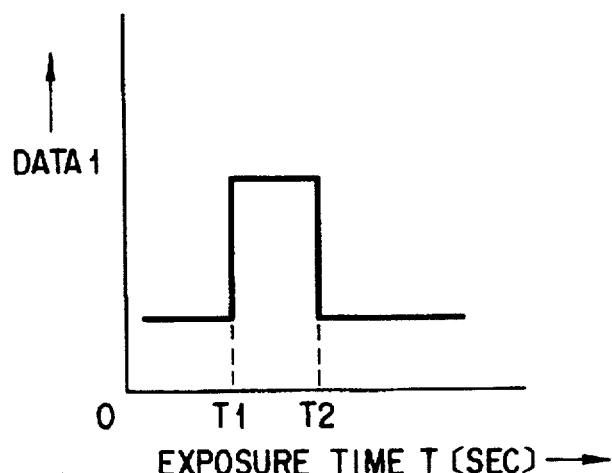
F I G. 7

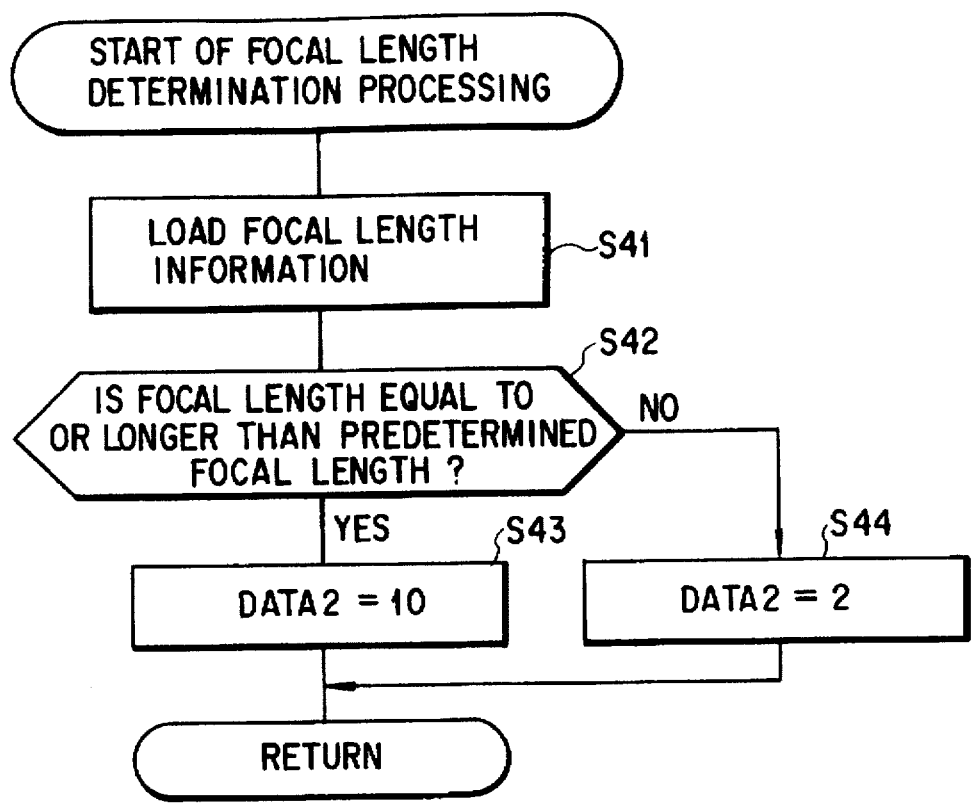
F I G. 8
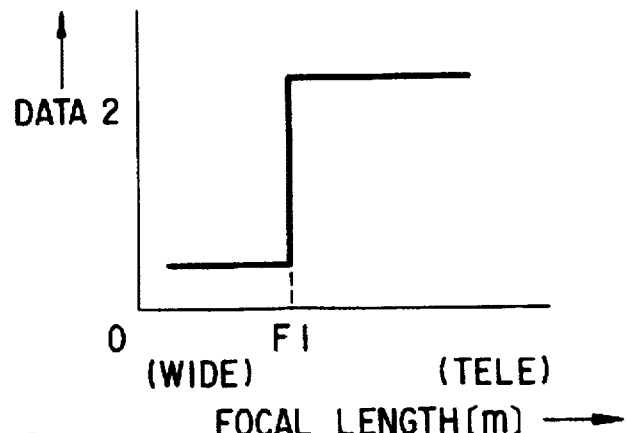
F I G. 9

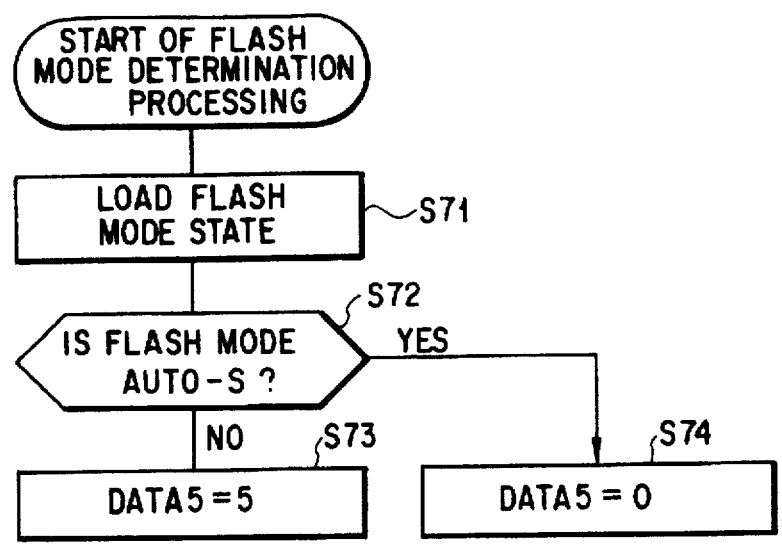
F I G. 12
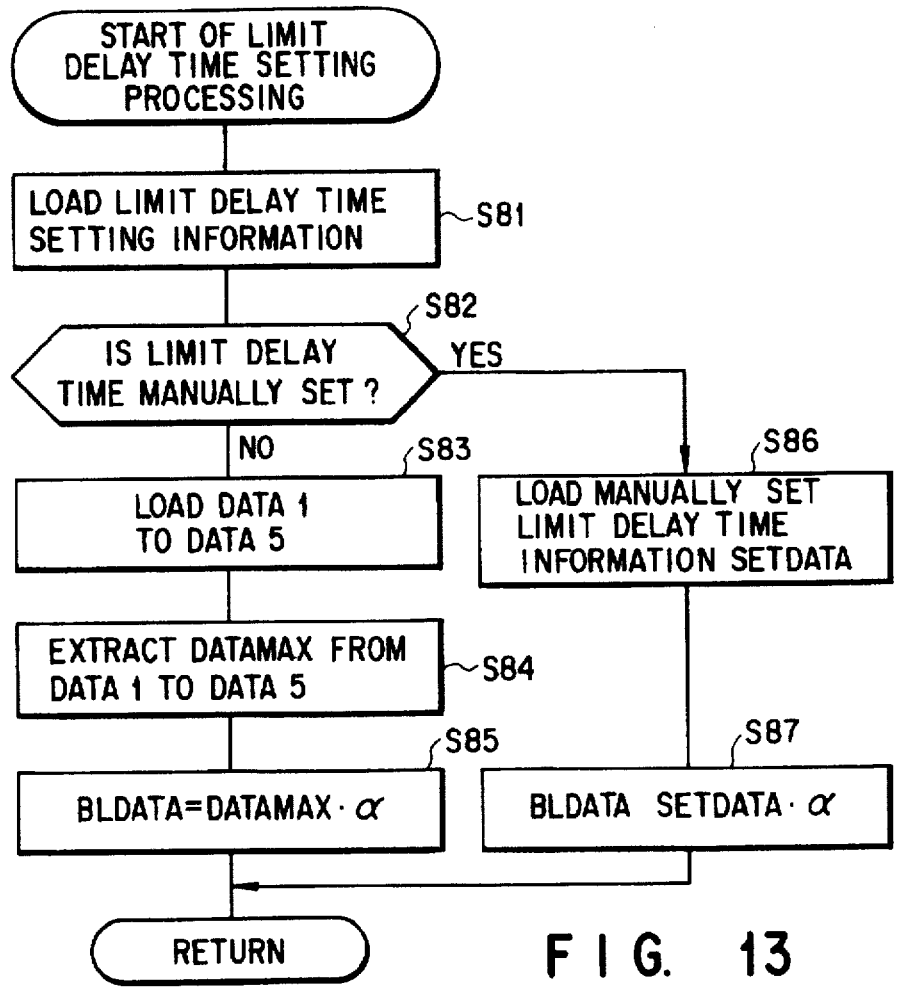
F I G. 13

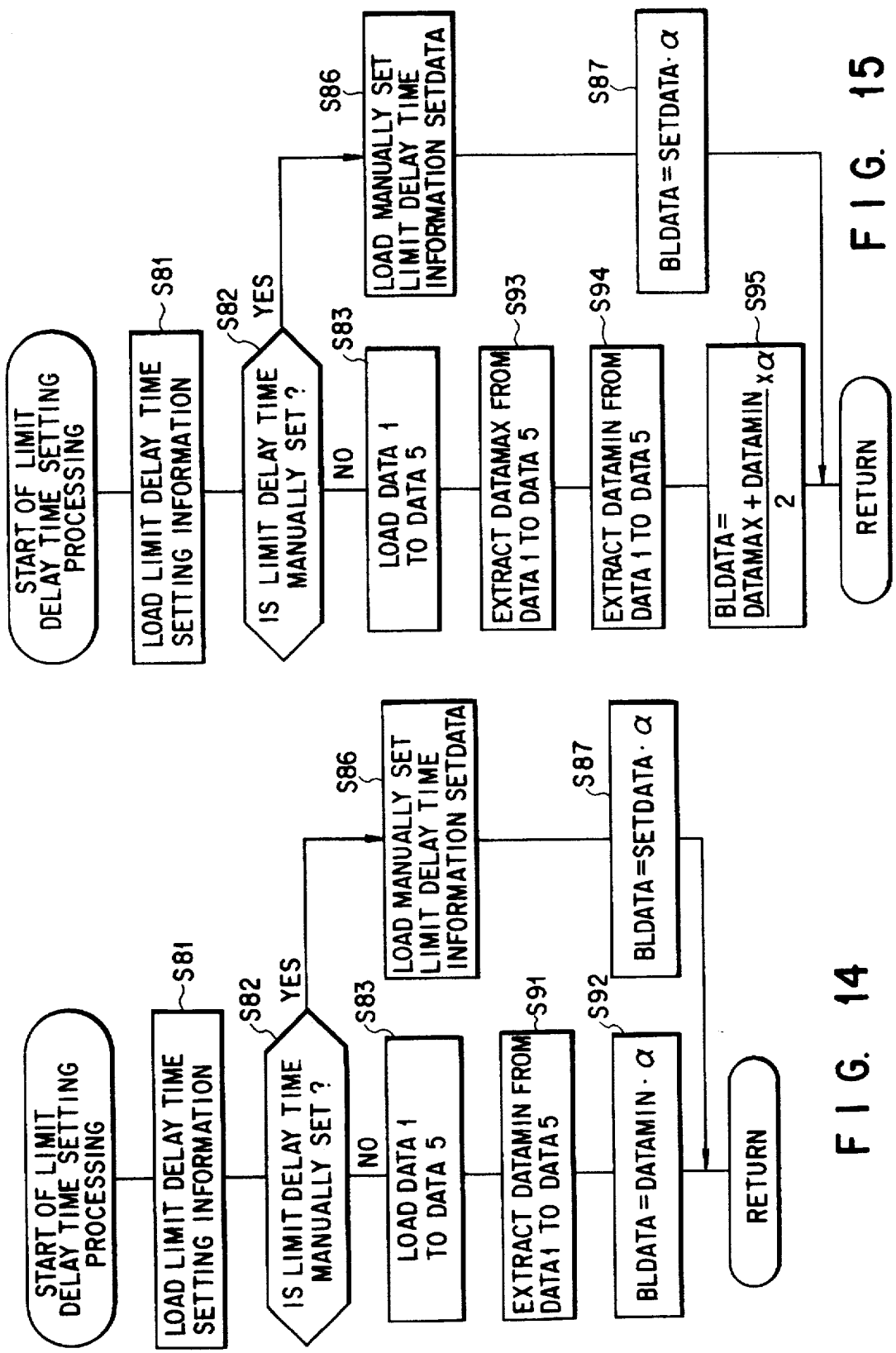

IMAGE BLUR PREVENTION DEVICE FOR CAMERA

BACKGROUND OF THE INVENTION

1. Field of the Invention

The present invention relates an image blur prevention device for a camera based on a so-called release timing control scheme in which a camera shake is detected, and exposure is performed at a timing when the shake is small.

2. Description of the Related Art

Devices for reducing the influences of camera shakes on the photographing operations have been developed.

For example, the following technique is disclosed in U.S. Pat. No. 5,150,150 (Jpn. Pat. Appln. KOKAI Publication No. 3-92830). According to this technique, the angular velocity of a camera shake is detected, and the camera shake is considered to be small when the absolute value of the angular velocity is equal to or smaller than a predetermined value or is decreasing below the predetermined value, A shutter operation is started at this timing because the influences of the shake are reduced when exposure is performed at the timing.

Jpn. Pat. Appln. KOKAI Publication No. 63-53531 discloses a technique of starting an exposure operation near the peak of a camera shake displacement, i.e., starting an exposure operation at zero shake speed.

The above conventional techniques are characterized in that an exposure operation is started after the angular velocity of a camera shake becomes small. These techniques are intended for applications in, for example, the following photographing operations: a photographing operation at higher shutter speeds in which no significant problems are posed in terms of an image blur even if a camera shake occurs; a wide-angle photographing operation; and a photographing operation at lower shutter speeds in which the angular velocity of a camera shake cannot remain in a small range within a predetermined exposure time.

In many cases, in such photographing operations, there is almost no difference in image blur amount between a photograph obtained by an exposure operation started after the angular velocity of a camera shake becomes small and a photograph obtained by an exposure operation started immediately after a photographer designates an exposure operation start. If a photographing operation is made to wait until the camera shake subsides or diminishes, the wait time directly becomes a release time lag. That is, this wait time is an unwanted time.

In addition, since an exposure operation is started after the angular velocity of a camera shake becomes small, basically the exposure operation is not (cannot) started before the camera shake dies down. This wait time directly becomes a release time lag. For this reason, this release time lag may pose problems in, for example, the following photographing operations: a photographing operation to be performed with shutter chance priority; a continuous photographing operation which attaches importance to the number of frames which can be shot within a unit time; and a flash pre-emission mode for preventing a pink-eye effect in a flash mode.

SUMMARY OF THE INVENTION

It is, therefore, an object of the present invention to provide an image blur prevention device for a camera, which reduces the influences of camera shakes on photographing operations and exhibits good operability without posing problems when a release time lag occurs.

According to the present invention, there is provided an image blur prevention device for a camera, comprising: means for detecting a camera shake state during an exposure sequence after a release operation, and outputting a shake signal; means for outputting a first exposure start signal upon detecting that the shake signal is smaller than a predetermined value; timer means for counting an elapsed time from an exposure sequence start, and generating a second exposure start signal when a predetermined timer time has elapsed; and exposure start means for starting an exposure operation in response to one of the first and second exposure start signals which is output first.

Another object of the invention is provide an image blur prevention device for a camera, comprising: shake detecting means for detecting a camera shake state; shake determining means for determining a camera shake state on the basis of an output from the shake detecting means; release operating means for instructing a photographing operation of the camera; exposure control means for controlling an exposure operation start timing of the camera in accordance with a determination result obtained by the shake determining means and an operation state of the release operating means; delay time setting means for, when a photography start signal is input from the release operating means, setting a wait time for a photographing operation start and outputting the set time to the exposure control means; and timer means for counting an elapsed time after the photography start signal from the release operating means is input, wherein a count result obtained by the timer means is compared with the time set by the delay time setting means to determine whether to delay an exposure operation start timing of the camera.

Still another object of the invention is provide an image blur prevention device for a camera, which detects a camera shake state and prevents influences of a shake in an exposure operation, comprising: setting means for setting a shutter speed of the camera; detecting means for detecting a camera shake and outputting a shake state signal; a manual operating member for instructing a shift from a preparatory photographing operation to an exposure operation; timer means for counting an elapsed time after the manual operating member is operated; and control means for starting an exposure operation in accordance with an operation of the manual operating member when the timer means finishes counting a predetermined time set in accordance with the shutter speed, or a level of the shake state signal becomes not higher than a predetermined level.

Other object of the invention is provide a device for a camera, comprising: exposure instructing means for instructing the camera to perform an exposure operation; a plurality of exposure permitting means for outputting a plurality of permission signals for permitting film exposure on the basis of a plurality of conditions; and control means for performing film exposure in response to one of the plurality of permission signals which is output first.

Another object of the invention is provide an image blur prevention device for a camera, comprising: shake detecting means; shake determining means for receiving an output from the shake detecting means and determining a level of a shake; release operating means; control means for controlling an exposure start timing on the basis of an output from the shake determining means and a state of the release operating means; shutter means for performing an exposure operation in response to an output from the control means; timer means for counting an elapsed time after the release operating means is operated; setting means for setting a wait time between the instant at which the release operating means is operated and the instant at which the shutter means operates; and means for comparing the count result obtained by the timer means with the wait time set by the setting means, and determining an exposure start timing in accordance with the comparison result in preference to the control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically showing the arrangement of an image blur prevention device for a camera according to an embodiment of the present invention;

FIG. 2 is a block diagram of the basic arrangement of the image blur prevention device, showing the arrangement in FIG. 1 in more detail;

FIG. 6 is a flow chart for explaining the contents of exposure time determination processing in step S5 in FIG. 5;

FIG. 7 is a graph for explaining the exposure time;

FIG. 8 is a flow chart for explaining the contents of focal length determination processing in step S13 in FIG. 5;

FIG. 9 is a graph for explaining the focal length;

FIG. 12 is a flow chart for explaining flash determination processing in step S16 in FIG. 5;

FIG. 13 is a flow chart for explaining the contents of limit delay time setting processing in step S17 in FIG. 5;

FIG. 14 is a flow chart for explaining the contents of another case of limit delay time setting processing in step S17 in FIG. 5;

FIG. 15 is a flow chart for explaining still another case of limit delay time setting processing in step S17 in FIG. 5.

DETAILED DESCRIPTION OF THE EMBODIMENTS

Figure 3A:
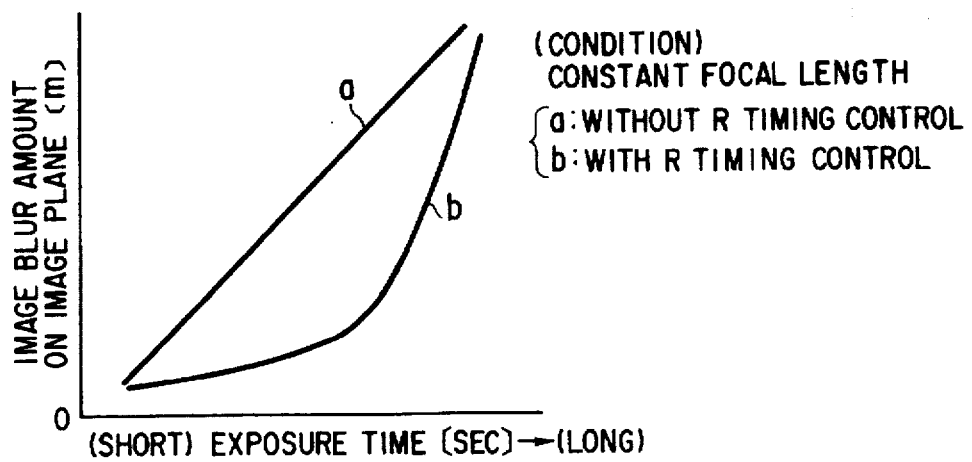
FIG. 3A is a graph showing the relationship (with a constant focal length) between the photographing exposure time and the image blur amount on the image plane.

The embodiments of the present invention will be described below with reference to the accompanying drawings.

FIG. 1 is a block diagram schematically showing the arrangement of an image blur prevention device for a camera according to an embodiment of the present invention.

Referring to FIG. 1, a shake detecting section 2 serves to detect the camera shake state, and uses one or two known vibration gyroscopes. Information on a camera shake detected by the shake detecting section 2 is sent to an exposure control section 6 through a shake determining section 4. The exposure control section 6 serves to control the exposure operation of the camera, and permit/inhibit the operation. A limit delay time setting section 8, a shutter drive section 10, a release operating section 12, and a timer section 14 are connected to the exposure control section 6.

A limit time within which the camera actually starts a photographing operation upon reception of a photography start designation signal input through the release operating section 12 is set in the limit delay time setting section 8. The release operating section 12 receives an exposure start instruction from the photographer. The timer section 14 counts the time set in the limit delay time setting section 8.

In this arrangement, the camera shake detected by the shake detecting section 2 is sent to the shake determining section 4. The shake determining section 4 then determines the current image blur state on the image plane on the basis of the current camera shake state, photographing focal length, exposure time, and the like. As a result, information corresponding to the level of the current image blur state is sent from the shake determining section 4 to the exposure control section 6.

On the basis of the image blur state (level) information sent from the shake determining section 4 when an exposure start instruction signal is received, the limit delay time information set in the limit delay time setting section 8, and the count result obtained by the timer section 14, the exposure control section 6 determines whether to start an exposure operation in response to the instruction from the release operating section 12. If the exposure control section 6 determines to start exposure, a shutter unit (not shown) is driven by the shutter drive section 10 to perform an exposure operation. If the exposure control section 6 determines not to start exposure, the shutter drive section 10 is stopped so as not to perform an exposure operation.

A portion associated with determination performed by the exposure control section 6 to start or not to start the exposure operation will be described in detail next with reference to FIG. 2.

FIG. 2 is a block diagram of the basic arrangement of the image blur device for a camera, showing the arrangement in FIG. 1 in more detail. Note that the same reference numerals in FIG. 2 denote the same parts as in FIG. 1, and a description thereof will be omitted.

Referring to FIG. 2, an exposure time information detecting section 16, a focal length information detecting section 18, a limit delay time input section 20, a flash mode information detecting section 22, an exposure mode information detecting section 24, and a drive mode information detecting section 26 are connected to the limit delay time setting section 8.

The exposure time information detecting section 16 is a means for detecting the exposure time set by the photographer or automatically determined by the camera. Exposure time information detected by the exposure time information detecting section 16 is sent to the shake determining section 4 to be used to calculate the image blur amount based on a camera shake.

The focal length information detecting section 18 is a means for detecting the current photographing focal length state. The focal length information detected by this section is sent to the shake determining section 4 to be used to calculate the image blur amount based on a camera shake.

The flash mode information detecting section 22 is a means for detecting the flash mode set in the camera, e.g., "AUTO", "AUTO-S", "FILL-IN", or "OFF". The exposure mode information detecting section 24 is a means for detecting the exposure mode set in the camera, e.g., a program, manual, shutter-priority mode, or aperture-priority mode. The drive mode information detecting section 26 is a means for detecting the drive mode set in the camera (e.g., a single or continuous mode).

The limit delay time setting section 8 receives detection results obtained by these information detecting means to set an appropriate limit delay time. The limit delay time input section 20 is a means for setting the limit delay time in the limit delay time setting section 8 independently of the detection results obtained by the above information detecting means.

A shutter unit 28 used to actually perform exposure is connected to the shutter drive section 10. For example, the shutter unit 28 is constituted by the quick return mirror of an SLR (Single Lens Reflex) camera and the lens shutter unit of an LS (Lens Shutter) camera.

A display section 30 serving as the display means of this camera is connected to the exposure control section 6. The display section 30 displays the current exposure time information detected by the exposure time information detecting section 16, the current image blur information level determined by the shake determining section 4, and the like.

An image blur prevention measure for the camera, which is taken to prevent an image blur by detecting a camera shake and performing exposure when the level of the image blur state is low, will be described below.

In general, when the photographer operates the exposure control section 6 to give an exposure start instruction, an exposure operation is quickly performed. Assume that the level of the image blur state is high. In this case, the exposure operation is preferably performed after the image blur subsides because the resultant photograph exhibits a small image blur. Determination/control to start or not to start the exposure operation in this manner will be referred to as "release timing control" hereinafter.

The present applicant, however, confirmed after actual photographing operations and studies that there is no significant difference in image blur amount between a photograph obtained by an exposure operation performed after the camera shake settles down upon release timing control and a photograph obtained by an exposure operation quickly performed when the photographer instructs an exposure start, depending on the exposure time and the focal length in the photographing operation.

Figure 3B:
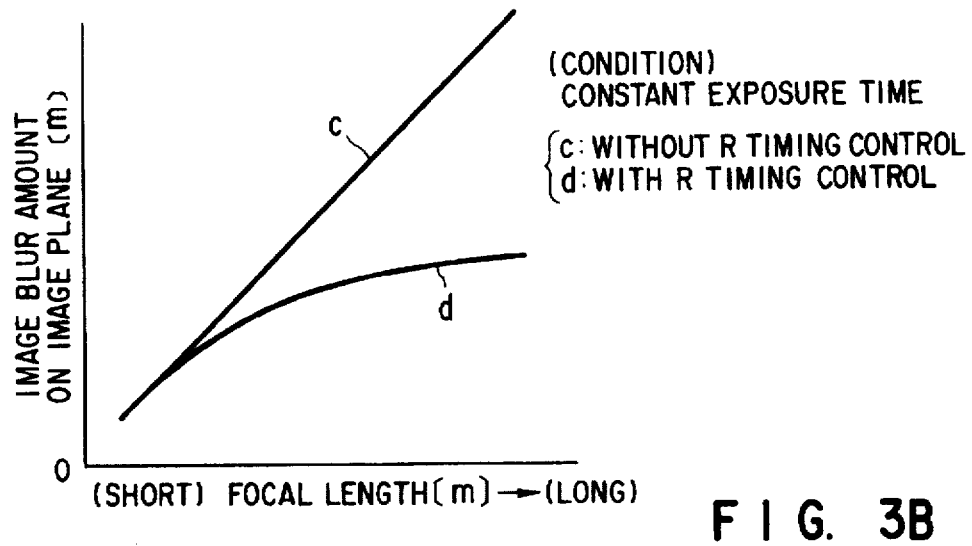
FIG. 3B is a graph showing the relationship (with a constant exposure time) between the photographing focal length and the image blur amount on the image plane.

FIGS. 3A and 3B are graphs for explaining this confirmation. FIG. 3A is a graph showing the relationship (with a constant focal length) between the photographing exposure time and the image blur amount on the image plane. FIG. 3B is a graph showing the relationship (with a constant exposure time) between the photographing focal length and the image blur amount on the image plane. These graphs are obtained by averaging many samples.

Referring to FIG. 3A, a curve a represents a case wherein no release timing control is performed, and a curve b represents a case wherein release timing control is performed. Similarly, referring to FIG. 3B, a curve c represents a case wherein no release timing control is performed, and a curve d represents a case wherein release timing control is performed.

Referring to FIG. 3A, as is apparent, when the exposure time is short, there is almost no difference in image blur amount on the image plane between the curves a and b. This is because the influences of a camera shake are essentially small when the exposure time is short, and camera shakes cannot remain small in long exposure times. In contrast to this, when intermediate exposure times are set, the curves a and b exhibit a clear difference in image blur amount.

Referring to FIG. 3B, as is apparent, when the focal length is short, there is almost no difference in image blur amount on the image plane between the curves c and d. This is because the influences of a camera shake are essentially small when the focal length is short. In contrast to this, as the focal length increases, the difference in image blur amount between the curves c and d becomes conspicuous.

Referring to FIGS. 3A and 3B, as is apparent, release timing control can be effectively performed in regions (exposure times and focal lengths) where the curves a and b, and c and d exhibit clear differences.

In addition to the above description, note that the camera shake caused by the photographer subsides at irregular timings regardless of the exposure time and the focal length. Sometimes the shake dies down quickly (e.g., within several ten msec) and at other times the shake does not die down even after a lapse of one second or more. Considering the time taken for the shake to subside as an "exposure delay time", this exposure time directly leads to a release time lag.

In principle, prevention of the influences of a camera shake results in a release time lag. In a case wherein release timing control (starting an exposure operation when the shake is small) and an operation without release timing control make almost no difference (i.e., in a case wherein corresponding exposure time and focal length are set), there is almost no merit in terms of image blur prevention, but only a release time lag is produced.

The relationship between the exposure delay time and the image blur amount on the image plane after a photographing operation will be described below with reference to FIG. 4.

Figure 4:
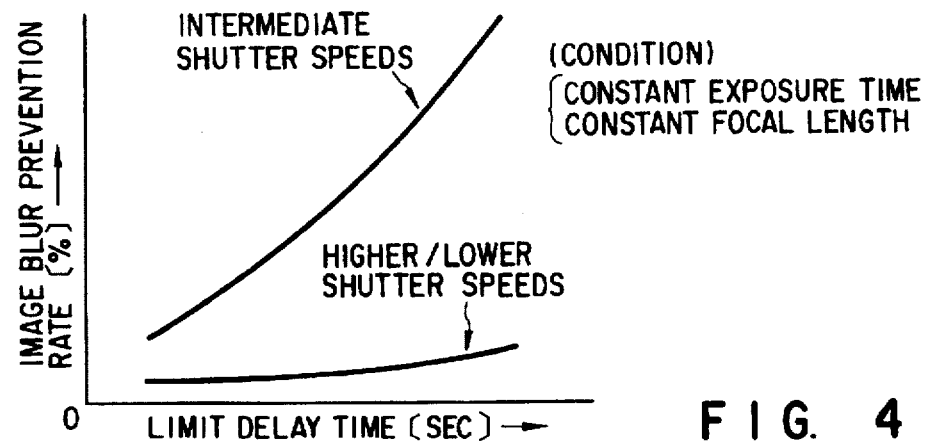
FIG. 4 is a graph showing the relationship (with a constant exposure time and a constant focal length) between the limit delay time and the image blur prevention rate.

FIG. 4 is a graph showing the relationship (with a constant exposure time and a constant focal length) between the limit delay time and the image blur prevention rate. This graph is obtained by averaging many samples.

Referring to FIG. 4, at "intermediate shutter speeds", when the limit delay time is long, the exposure operation can wait long for a timing when the shake subsides. In contrast to this, when the limit delay time is short, the exposure operation cannot wait much long for a timing when the shake subsides. As is apparent from FIG. 4, as the limit delay time is set longer, a timing when the shake subsides is easily provided. If an exposure operation is started at this timing, a photographing operation can be performed without much influences of a camera shake.

Referring back to FIGS. 3A and 3B, as described above, when the photographing exposure time is short and long, and the photographing focal length is short, an operation based on release timing control and an operation without release timing control make no significant difference in image blur prevention effect (image blur amount on the image plane). In the graph of FIG. 4, the "higher/lower shutter speeds" curve indicates this fact. If there is no difference in image blur prevention effect, the release time lag (exposure delay time) is preferably minimized.

The camera according to the present invention is characterized in that a relatively short limit delay time is set in a photographing condition in which much image blur effect cannot be expected even if the above release timing control is performed, and a photographing mode in which the release time lag is preferably minimized.

The operation of the camera according to an embodiment of the present invention will be described next with reference to the flow chart of FIG. 5.

First of all, in step S1, the camera is initialized. In step S2, a timer BLCOUNT for counting the limit delay time (to be described later) is reset (=0).

In step S3, a key (operation setting means) input from a camera (not shown) is received. In this case, pieces of information associated with operation setting, e.g., setting of an exposure mode, a flash mode, and a drive mode, a zooming operation for photographing focal length determination, and manual setting of a limit delay time, are received. In accordance with this set state, a predetermined exposure time and a predetermined focal length are determined, and the photographing state and mode (to be described later) are determined.

In step S4, it is checked whether a first release (1R) signal for the camera is input. If NO in step S4, the flow advances to step S3. If YES in step S4, the flow advances to step S5.

When a photometric operation is performed in step S5, a distance measuring operation or a focus detecting operation is performed in step S6. In step S7, detection of a camera shake is performed (started) by the shake detecting section 2. In this shake detection, analog shake information is loaded as multi-level quantized information by the A/D conversion function of a CPU (Camera Control Means) (not shown). In step S8, the image blur speed and amount are calculated by a known method on the basis of the camera shake information detected in step S7. In step S9, the current image blur state is determined from the image blur calculation results obtained in step S8, and notification/warning about an image blur is performed by the display section 30, as needed.

In step S10, it is checked whether a second release (R2) signal for the camera is input. If NO in step S10, the flow returns to step S4. If YES in step S10, the flow advances to step S11.

In step S11, the second release signal input in step S10 is received. In this case, extension (LD) of a focusing lens (not shown) is performed in the case of a lens shutter camera, and a mirror-up operation for a quick return mirror (not shown) is performed in the case of an SLR camera.

In step S12, determination processing for setting the limit delay time for release timing control on the basis of the photographing exposure time is performed. The contents of exposure time determination processing will be described with reference to the flow chart of FIG. 6 and the graph of FIG. 7.

Referring to FIG. 6, in step S31, exposure time information determined by the photometric result obtained in step S5 is loaded. In step S32, it is checked whether the exposure time information loaded in step S31 is shorter than a predetermined exposure time I. If it is determined that the photographing exposure time loaded in step S31 is shorter than the predetermined exposure time I, the flow advances to step S35. Otherwise, the flow advances to step S33. Note that, for example, the predetermined exposure time I is 1/125 [sec] or 1/250[sec].

In step S33, it is checked whether the exposure time information I loaded in step S31 is longer than a predetermined exposure time II. If the photographing exposure time loaded in step S31 is longer than the predetermined exposure time II, the flow advances to step S35. Otherwise, the flow advances to step S34. Note that, for example, the predetermined exposure time II is 1/60 [sec].

If it is determined in steps S32 and S33 that the photographing exposure time is longer than the predetermined exposure time I and shorter than the predetermined exposure time II, the flow advances to step S35. In step S35, information "DATA 1" of the limit delay time corresponding to the photographing exposure time is set to "DATA 1=10". Thereafter, the flow exits from the main routine and advances to step S12 in the flow chart of FIG. 5.

If it is determined in step S32 or S33 that the photographing exposure time is shorter than the predetermined exposure time I or longer than the predetermined exposure time II, the flow advances to step S35 to set the information "DATA 1" of the limit delay time corresponding to the photographing exposure time to "DATA 1=2". Thereafter, the flow exits from the main routine and advances to step S12 in the flow chart of FIG. 5.

"DATA 1" in step S34 and "DATA 1" in step S35 have the following relationship: DATA 1 (step S34)>DATA 1 (step S35). FIG. 7 shows the relationship between the two kinds of DATA 1. DATA 1 is set to different values in a case wherein the (photographing) exposure time is longer than the predetermined exposure time I (T1) and shorter than a predetermined exposure time II (T2), and other cases. More specifically, a relatively long limit delay time is set by increasing the value of DATA 1 within the exposure time range in which an image blur prevention effect can be expected from release timing control, as in the range from time T1 to time T2.

Referring to FIG. 7, the value of DATA 1 changes stepwise at time T1 and time T2 as boundaries. However, the present invention is not limited to this. For example, the relationship between the exposure time and DATA 1 may change smoothly.

Figure 5:
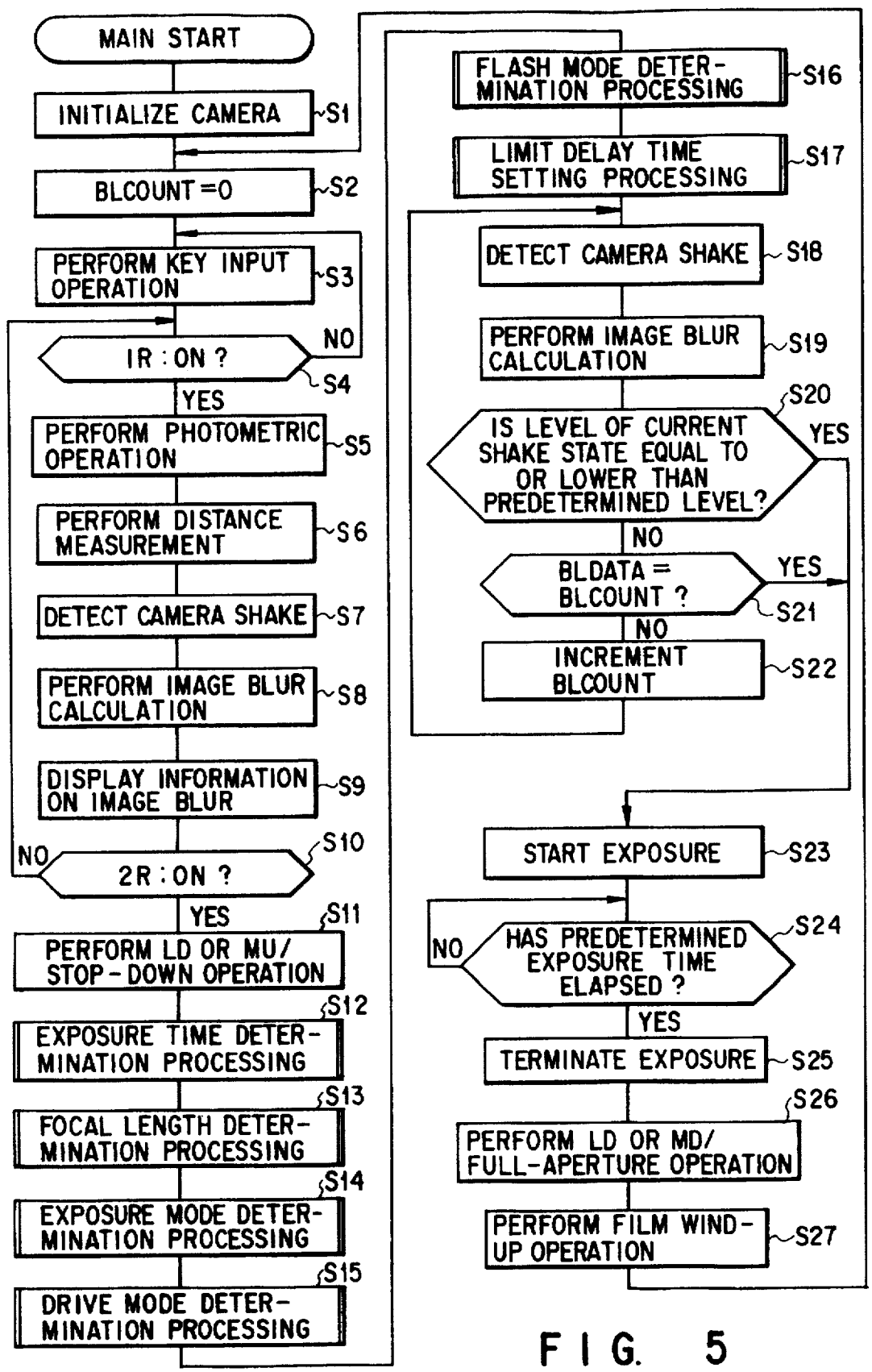
FIG. 5 is a flow chart for explaining the operation of a camera in detail in an embodiment of the present invention.

Referring back to the flow chart of FIG. 5, in step S13, determination processing is performed to set the limit delay time for release timing control on the basis of the photographing focal length. The contents of this focal length determination processing will be described below with reference to the flow chart of FIG. 8 and the graph of FIG. 9.

Referring to FIG. 8, in step S41, the photographing focal length information determined by the key input operation in step S3 is loaded.

In step S42, it is checked whether the focal length information loaded in step S41 is equal to or larger than a predetermined focal length. If it is determined that the photographing focal length loaded in step S41 is equal to or larger than the predetermined focal length, the flow advances to step S43. Otherwise, the flow advances to step S44. Note that, for example, the predetermined focal length is (1/exposure time [sec]) [mm] or 50 [mm] (fixed).

If it is determined in step S42 that the photographing focal length is equal to or larger than the predetermined focal length, the flow advances to step S43. In step S43, for example, information "DATA 2" of the limit delay time corresponding to the photographing focal length is set to "DATA 2=10". Thereafter, the flow exits from the main routine and advances to step S13 in the flow chart of FIG. 5.

If it is determined in step S42 that the photographing focal length is smaller than the predetermined focal length, the flow advances to step S43. In step S43, for example, the information "DATA 2" of the limit delay time corresponding to the photographing exposure time is set to "DATA 2=2". Thereafter, the flow exits from the main routine and advances to step S13 in the flow chart of FIG. 5.

In this case, "DATA 2" in step S43 and "DATA 2" in step S44 have the following relationship: DATA 2 (step S43) >"DATA 2" (step S44). FIG. 9 shows the relationship between two kinds of DATA 2. DATA 2 is set to different values depending on whether the (photographing) focal length is smaller or equal to and larger than the predetermined focal length (F1). More specifically, a relatively long limit delay time can be set by increasing the value of DATA 2 within the focal length range in which an image blur prevention effect can be expected from release timing control, as in the case wherein the photographing focal length is equal to or larger than the focal length F1.

Referring to FIG. 9, the value of DATA 1 changes stepwise at F1 as a boundary. However, the present invention is not limited to this. For example, the relationship between the focal length and DATA 2 may change smoothly.

Referring back to the flow chart of FIG. 5, in step S14, determination processing is performed to set the limit delay time for release timing control in accordance with the photographing exposure mode. The contents of this exposure mode determination processing will be described with reference to the flow chart of FIG. 10.

Figure 10:
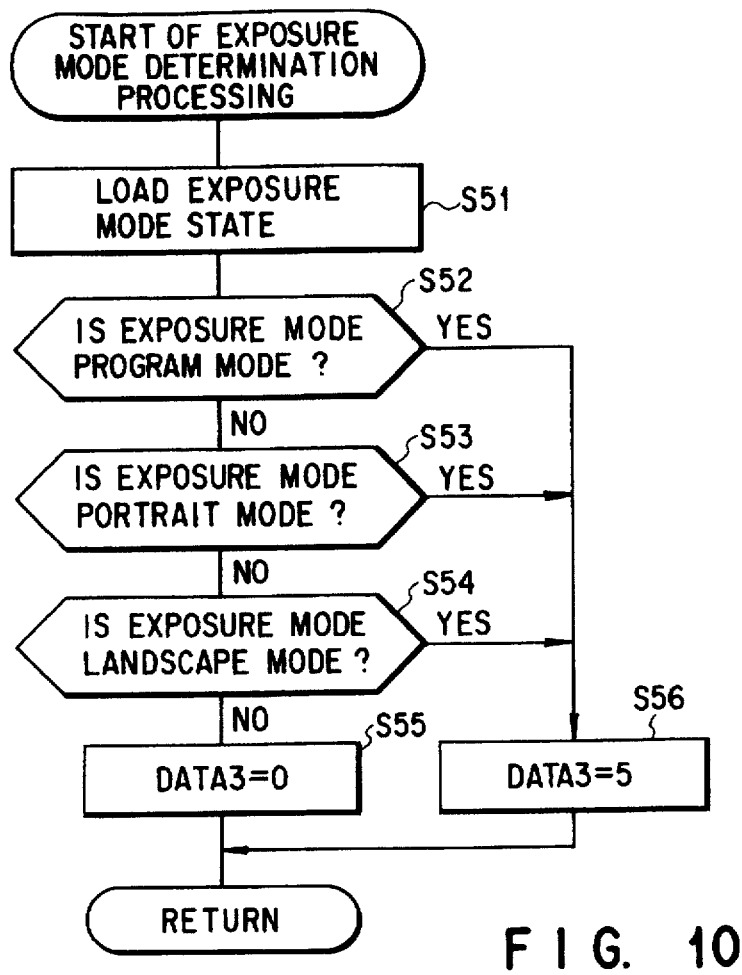
FIG. 10 is a flow chart for explaining the contents of exposure mode determination processing in step S14 in FIG. 5.

Referring to FIG. 10, in step S51, the photographing exposure mode information determined by the key input operation in step S3 is loaded. In step S52, it is checked whether the photographing exposure mode information loaded in step S51 indicates the program mode. If it is determined that the photographing exposure mode loaded in step S51 indicates the program mode, the flow advances to step S56. Otherwise, the flow advances to step S53.

In step S53, it is checked whether the photographing exposure mode information loaded in step S51 indicates the portrait mode. If it is determined that the photographing exposure mode indicates step S51 indicates the portrait mode, the flow advances to step S56. Otherwise, the flow advances to step S54.

In step S54, it is checked whether the photographing exposure mode information loaded in step S51 indicates the landscape mode. If it is determined that the photographing exposure mode information loaded in step S51 indicates the landscape mode, the flow advances to step S56. Otherwise, the flow advances to step S55.

If the flow advances to step S55 in accordance with the determination results in steps S52, S53, and S54, the photographing exposure mode is one of the following modes: the manual mode, the shutter-priority mode, the aperture-priority mode, and the stop motion mode. In step S55, for example, information "DATA 3" of the limit delay time corresponding to the photographing exposure mode is set to "DATA 3=0". Thereafter, the flow exits from the main routine and advances to step S15 in the flow chart of FIG. 5.

If the flow advances to step S56 in accordance with the determination results in steps S52, S53, and S54, the photographing exposure mode is one of the following modes: the program mode, the portrait mode, and the landscape mode. In step S56, for example, the information "DATA 3" of the limit delay time corresponding to the photographing exposure mode is set to "DATA 3=5". Thereafter, the flow exits from the main routine and advances to step S15 in the flow chart of FIG. 15.

In this case, "DATA 3" in step S55 and "DATA 3" in step S56 have the following relationship: DATA 3 (step S55) <DATA 3 (step S56). DATA 3 is set to different values in a case wherein the photographing exposure mode is the program, portrait, or landscape mode, and other cases. More specifically, a relatively short limit delay time can be set by decreasing the value of DATA 3 in a photographing mode in which a shutter chance may be missed owing to release timing control when the photographing exposure mode is the manual, shutter-priority, aperture-priority, stop motion mode, or the like.

Referring back to the flow chart of FIG. 5, in step S15, determination processing is performed to set the limit delay time for release timing control in accordance with the drive mode. The contents of this drive mode determination processing will be described with reference to the flow chart of FIG. 11.

Figure 11:
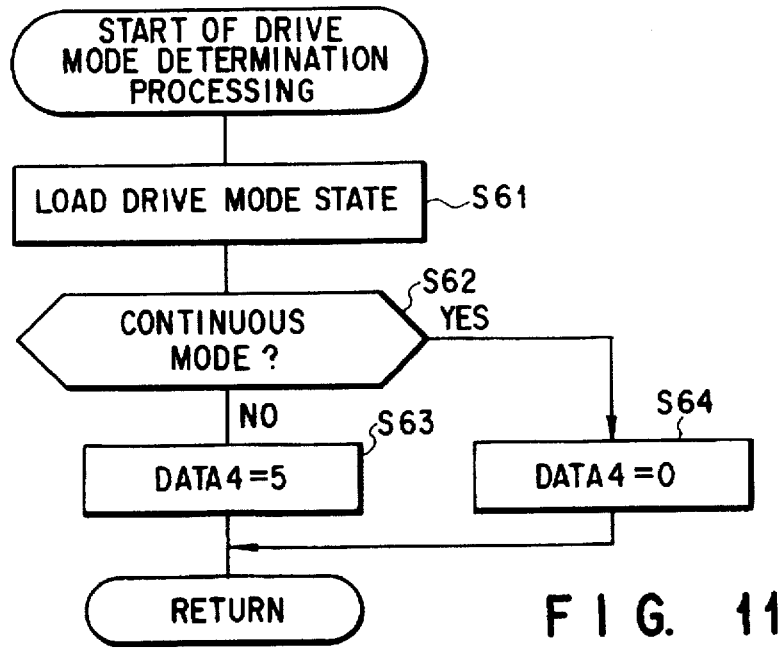
FIG. 11 is a flow chart for explaining the contents of drive mode determination processing in step S15 in FIG. 5.

Referring to FIG. 11, in step S61, the drive mode information set by the key input operation in step S3 is loaded. In step S62, it is checked whether the drive mode information loaded in step S61 indicates the continuous mode. If it is determined that the drive mode information loaded in step S61 indicates the continuous mode, the flow advances to step S64. Otherwise, the flow advances to step S63.

If the flow advances to step S63, the drive mode is the single mode. In step S63, for example, information "DATA 4" of the limit delay time corresponding to the drive mode is set to "DATA 4=5". The flow then exits from the main routine and advances to step S16 in the flow chart of FIG. 5.

If the flow advances to step S64, the drive mode is the continuous mode. For example, the information "DATA 4" of the limit delay time corresponding to the drive mode is set to "DATA 4=0". The flow then exits from the main routine and advances to step S16 in the flow chart of FIG. 5.

In this case, "DATA 4" in step S63 and "DATA 4" in step S64 have the following relationship: DATA 4 (step S63) <DATA 4 (step S64). DATA 4 is set to different values depending on whether the drive mode is the continuous mode or the single mode. More specifically, when the drive mode is the continuous mode, the limit delay time (to be described later) can be set to be relatively short by setting the value of DATA 4 to be smaller than that in the signal mode to minimize the release time lag (delay time) due to release timing control so as to ensure a shutter chance.

Referring back to the flow chart of FIG. 5, in step S16, determination processing is performed to set the limit delay time for release timing control in accordance with the flash mode. The contents of this flash mode determination processing will be described with reference to the flow chart of FIG. 12.

Referring to FIG. 12, in step S71, the flash mode information determined by the key input operation in step S3 is loaded. In step S72, it is checked whether the flash mode information loaded in step S71 indicates the flash emission mode (AUTO-S) including flash pre-emission processing for preventing a pink-eye effect in a photographing operation. If it is determined that the flash mode information loaded in step S71 indicates the AUTO-S mode, the flow advances to step S74. Otherwise, the flow advances to step S73.

If the flow advances to step S73, the flash mode is a mode other than the AUTO-S mode, i.e., the AUTO, FILL-IN, or OFF mode. In step S73, for example, information "DATA 5" of the limit delay time corresponding to the flash mode is to "DATA 5=5". Thereafter, the flow exits from the main routine and advances to step S17 in the flow chart of FIG. 5.

If the flow advances to step S74, the flash mode is the emission (AUTO-S) mode including flash pre-emission processing. In step S74, for example, the information "DATA 5" of the limit delay time corresponding to the flash mode is set to "DATA 5=0". Thereafter, the flow exits from the main routine and advances to step S17 in the flow chart of FIG. 5.

In this case, "DATA 5" in step S73 and "DATA 5" in step S74 have the following relationship: DATA 5 (step S73) <DATA 5 (step S74). DATA 5 is set to different values in a case wherein the flash mode is the AUTO-S mode and other cases (AUTO, FILL-IN, and OFF modes).

If the flash mode is the AUTO-S mode, an exposure operation is started after a lapse of a delay time due to release timing control as well as a lapse of about 1 [sec] taken for flash pre-emission. That is, the release time lag which is longer than that in a normal operation is further prolonged by pre-emission, and hence the photographer may feel inadequate. For this reason, in the AUTO-S mode, the value of DATA 5 is set to be smaller than that in the single mode to set a relatively short limit delay time (to be described later).

Referring back to the flow chart of FIG. 5, in step S17, the limit delay time for release timing control is set in accordance with the determination processing in steps S11 to S16. The contents of this limit delay time setting processing will be described with reference to the flow chart of FIG. 13.

Referring to FIG. 13, in step S81, information indicating whether the limit delay time is set by the key input operation performed by the photographer in step S3 is loaded. In step S82, it is checked on the basis of the limit delay time setting information loaded in step S81 whether information indicating that a limit delay time for release timing control is set preferentially regardless of other photographing conditions is set. If it is determined that information indicating that a limit delay time is set preferentially regardless of other photographing conditions is set, the flow advances to step S86. Otherwise, the flow advances to step S83.

In step S83, the pieces of information (DATA 1 to DATA 5) about the limit delay times corresponding to the respective photographing conditions, which are described with reference to FIGS. 6 to 12, are loaded. In step S84, data DATAMAX having the maximum value 10 is extracted from the data DATA 1 to DATA 5 loaded in step S83.

In step S85, limit delay time data BLDATA is obtained by using the data DATAMAX extracted in step S84 according to BLDATA=DATAMAX/·α where α is a coefficient.

The data BLDATA is set by the limit delay time setting section 8 and sent to the exposure control section 6. The exposure control section 6 counts time by using the timer section 14 until the counted time becomes equal to the limit time BLDATA. This operation will be described detail later. Thereafter, the flow exits from the main routine and advances to step S18 in the flow chart of FIG. 5.

If it is determined in step S82 that information indicating that a limit delay time for release timing control is set preferentially regardless of other photographing conditions is set, the flow advances to step S86 to load the manually set limit time information SETDATA input by the photographer in step S3.

In step S87, the limit delay time BLDATA is obtained by using the SETDATA loaded in step S86 according to BLDATA=SETDATA·α where α is a coefficient. Note that this data BLDATA is equivalent to the data in step S85. Thereafter, the flow exits from the main routine and advances to step S18 in the flow chart of FIG. 5.

In step S18, detection for any camera shake is performed (started) by the shake detecting section 2. In this shake detection, analog shake information is loaded as multi-level quantized information by the A/D conversion function of a CPU (camera control means). In step S19, the image blur speed and amount are calculated by a known method on the basis of the camera shake information detected in step S18.

In step S20, it is checked on the basis of the shake information calculated in step S19 whether the level of the current shake state is equal to or lower than a predetermined level. In this case, the predetermined level is a level at which the image moving amount, i.e., the image blur amount, on the image plane upon occurrence of a camera shake in performing an exposure operation within a predetermined exposure time falls within, for example, the allowable range of the diameters of circles of confusion.

Assume that it is determined in step S20 that the level of the current shake state is equal to or lower than the predetermined level. In this case, since the camera shake has no influence on the photographing operation even if exposure is immediately performed, the flow advances to step S23. Assume that it is determined that the level of the current shake state is higher than the predetermined level, i.e., the camera shake is large. In this case, since the camera shake affects the photographing operation if exposure is immediately performed, exposure is preferably performed after the level of the shake state becomes equal to or lower than the predetermined level. In this case, therefore, the flow advances to step S21.

In step S21, the contents of the timer BLCOUNT reset in step S2 are compared with the contents of the data BLDATA determined in step S17 to determine whether BLDATA=BLCOUNT. If it is determined that the data BLDATA does not coincide with the data BLCOUNT, the flow advances to step S22. If it is determined that these data coincide with each other, the flow advances to step S23.

When step S21 is executed first after the execution of step S2 in the flow chart of FIG. 5, the value of BLCOUNT is set to 0. If, therefore, BLDATA=0 is set in step S17, BLDATA=BLCOUNT in first step S21.

As described above, the data BLDATA is limit delay time data. The contents of the timer BLCOUNT are incremented in step S22 (to be described later), and the flow returns to this loop again. The flow exits from the loop either when it is determined in step S20 that the shake is small, or when it is determined in step S21 that BLDATA=BLCOUNT, i.e., the limit delay time for release timing control has elapsed.

In step S22, the contents of the timer BLCOUNT are incremented. More specifically, this operation is performed by the timer section 14. Thereafter, the flow returns to step S18.

If it is determined in step S20 that the shake is small, or it is determined in step S21 that the limit delay time set in step S17 has elapsed, the flow advances to step S23 to start an exposure operation. More specifically, the shutter unit 28 is driven by the shutter drive section 10.

In step S24, it is checked whether the predetermined exposure time has elapsed. If NO in step S24, this determination processing is repeated. If YES in step S24, the flow advances to step S25 to terminate the exposure operation.

In step S26, in response to the exposure operation termination in step S25, an initial position return (LD) operation for the focusing lens (not shown) is performed in the case of a lens shutter camera, and a mirror-down operation for the quick return mirror (not shown) is performed in the case of an SLR camera. After a film wind-up operation is performed in step S27, the flow returns to step S2.

In the above embodiment based on the flow chart of FIG. 13, the maximum value is extracted from the data DATA 1 to DATA 5, and the data BLDATA is obtained by multiplying the extracted value by the coefficient α. With this processing, the limit delay time is set with priority being given to optimal photographing conditions and modes for release timing control.

FIG. 14 shows another subroutine for performing the limit delay time setting processing in step S17 in the flow chart of FIG. 5 described above. Another example of the limit delay time setting processing will be described below with reference to FIG. 14.

The flow chart of FIG. 14 differs from the flow chart of FIG. 13 in the following point. Referring to FIG. 13, the maximum value DATAMAX is extracted from the data DATA 1 to DATA 5 in step S84. In contrast to this, in step S91 in FIG. 14, a minimum value DATAMIN is extracted from the DATA 1 to DATA 5. After step S91, the limit delay time data BLDATA is obtained in step S92 according to BLDATA=DATAMIN·α.

That is, steps S84 and S85 in FIG. 13 are replaced with steps S91 and S92, but steps S81 to S83, S86, and S87 are the same as those in FIG. 13, and hence a description thereof will be omitted.

As described above, in the embodiment based on the flow chart of FIG. 14, the minimum value is extracted from the data DATA 1 to DATA 5, and the data BLDATA is obtained by multiplying the extracted value by the coefficient α. Therefore, the limit delay time is set with priority being given to the least optimal photographing conditions and modes for release timing control.

FIG. 15 is a flow chart for explaining still another example of the limit delay time setting processing, which is different from the examples shown in FIGS. 13 and 14. Still another example of the limit delay time setting processing will be described with reference to FIG. 15.

The flow chart in FIG. 15 differs from that of FIG. 13 in that steps S84 and S85 in FIG. 13 are replaced with steps S93 to S95.

Referring to FIG. 13, in step S84, the maximum value DATAMAX is extracted from the data DATA 1 to DATA 5. In contrast to this, in the example shown in FIG. 15, the same operation is performed in step S93, and the minimum value DATAMIN is extracted from the data DATA 1 to DATA 5 in step S94. In step S95, the limit delay time data BLDATA is obtained according to BLDATA=((DATAMAX+DATAMIN)/2)·α. Since the steps other than those described above, i.e., steps S81 to S83, S86, and S87 are the same as those in FIG. 13, a description thereof will be omitted.

In the embodiment based on the flow chart of FIG. 15, the minimum and maximum values are extracted from the data DATA 1 to DATA 5, and the data BLDATA is obtained by multiplying ½ the sum of the minimum and maximum values by the coefficient α. Therefore, as compared with the embodiments in FIGS. 13 and 14, the limit delay time is set in a well-balanced manner.

In each embodiment described above, photographing condition and mode determination processing, limit delay time setting processing, and the like in steps S12 to S17 in the flow chart of FIG. 5 need not always be performed between "LD or mirror-up operation/stop-down operation" in step S11 and "shake detection" in step S18.

Figure 16:
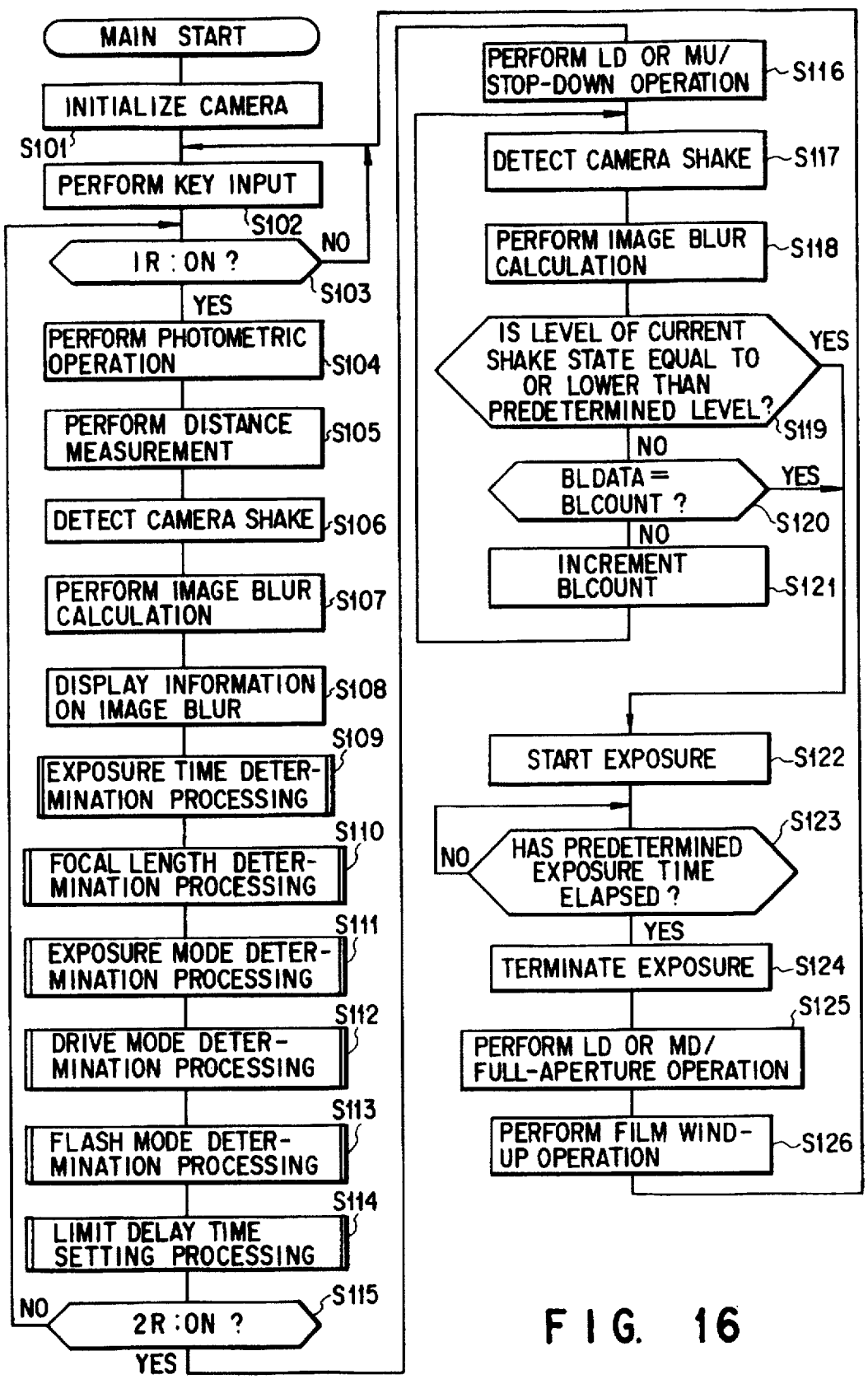
FIG. 16 is a flow chart for explaining the operation of a camera in another embodiment of the present invention.

For example, the processing may be performed in accordance with the flow chart of FIG. 16. In this case, the above photographing condition and mode determination processing, limit delay time setting processing, and the like are to be performed between "IR determination" in step S103 and "2R determination" step S115. That is, steps S101, S102 to S108, S109 to S114, S115, S116, and S117 to S126 in FIG. 16 respectively correspond to steps S1, S3 to S9, S12 to S17, S10, S11, and S18 to S27 in FIG. 5. A description of the contents of processing in the respective steps will therefore be omitted.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. An image blur prevention device for a camera, comprising:

means for detecting a camera shake state during an exposure sequence after a release operation, and outputting a shake signal;

means for outputting a first exposure start signal upon detecting that the shake signal is smaller than a predetermined value;

timer means for counting an elapsed time from an exposure sequence start, and generating a second exposure start signal when a predetermined timer time has elapsed; and exposure start means for starting an exposure operation in response to one of the first and second exposure start signals which is output first.

2. A device according to claim 1, wherein said timer means changes the predetermined elapsed time in accordance with one of set states of a shutter speed, an exposure mode, a film feed mode, a flash operation mode, and a focal length of a photographing lens.

3. An image blur prevention device for a camera, comprising:

shake detecting means for detecting a camera shake state;

shake determining means for determining a camera shake state on the basis of an output from said shake detecting means;

release operating means for instructing a photographing operation of the camera;

exposure control means for controlling an exposure operation start timing of the camera in accordance with a determination result obtained by said shake determining means and an operation state of said release operating means;

delay time setting means for, when a photography start signal is input from said release operating means, setting a wait time for a photographing operation start and outputting the set time to said exposure control means; and timer means for counting an elapsed time after the photography start signal from said release operating means is input, wherein a count result obtained by said timer means is compared with the time set by said delay time setting means to determine whether to delay an exposure operation start timing of the camera.

4. A device according to claim 3, wherein the time set by said delay time setting means is determined in accordance with the time set by said delay time setting means.

5. A device according to claim 4, wherein the time set by said delay time setting means is determined in accordance with an exposure time of the camera, and a time set by said delay time setting means is longer than a normal time when the exposure time is longer than a first predetermined time.

6. A device according to claim 5, wherein the time set by said delay time setting means is determined in accordance with an exposure time of the camera, and a time set by said delay time setting means is longer than the normal time when the exposure time is shorter than a second predetermined time which is longer than the first predetermined time.

7. A device according to claim 3, wherein the time set by said delay time setting means is determined in accordance with a photographing focal length of the camera.

8. A device according to claim 7, wherein the time set by said delay time setting means is determined in accordance with an photographing forcal length of the camera, and a time set by said delay time setting means is longer than a normal time when the focal length is larger than a predetermined value.

9. A device according to claim 3, wherein the time set by said delay time setting means is determined in accordance with a flash mode of the camera.

10. A device according to claim 9, wherein the time set by said delay time setting means is determined in accordance with a flash mode of the camera, and a time set by said delay time setting means is shorter than a normal time when the flash mode is a mode including flash pre-emission processing before exposure.

11. A device according to claim 3, wherein the time set by said delay time setting means is determined in accordance with an exposure mode of the camera.

12. A device according to claim 11, wherein the time set by said delay time setting means is determined in accordance with an exposure mode of the camera, and a time set by said delay time setting means is shorter than a normal time when the exposure mode is none of a program mode, a portrait mode, and a landscape mode.

13. A device according to claim 3, wherein said delay time setting means is determined in accordance with a drive mode as an operation mode of the camera.

14. A device according to claim 13, wherein the time set by said delay time setting means is determined in accordance with a drive mode as an operation mode of the camera, and a time set by said delay time setting means is shorter than a normal time when the drive mode is a continuous mode.

15. An image blur prevention device for a camera, which detects a camera shake state and prevents influences of a shake in an exposure operation, comprising:
setting means for setting a shutter speed of the camera;
detecting means for detecting a camera shake and outputting a shake state signal;
a manual operating member for instructing a shift from a preparatory photographing operation to an exposure operation;
timer means for counting an elapsed time after said manual operating member is operated; and
control means for starting an exposure operation in accordance with an operation of said manual operating member when said timer means finishes counting a predetermined time set in accordance with the shutter speed, or a level of the shake state signal becomes not higher than a predetermined level.

16. A device according to claim 15, wherein the predetermined time is set to an initial value when the set shutter speed of the camera falls outside a predetermined range, and is set to be longer than the initial value when the shutter time falls within the predetermined range.

17. An image blur prevention device for a camera, which can detect a camera shake state, comprising:
means for determining a shutter speed of the camera;
detecting means for detecting a camera shake state and outputting a shake state signal;
a manual operating member for instructing a shift from a preparatory photographing operation to an exposure operation;
timer means for counting an elapsed time after said manual operating member is operated; and
control means for setting a limit delay time between the instant at which said manual operating member is operated and the instant at which an exposure operation is started, in accordance with the shutter speed, and for starting an exposure operation in accordance with an operation of said manual operating member when the shutter speed falls within a predetermined range, and said timer means finishes counting the limit delay time, or when a level of the shake state signal becomes not higher than a predetermined level.

18. A device according to claim 17, further comprising detecting means for detecting a focal length value of a photographing lens, and
wherein said control means sets a value of the limit delay time to be larger than an initial value when the shutter speed falls within the predetermined range, and the focal length of the photographing lens is larger than a predetermined value.

19. A device according to claim 17, wherein said control means sets a value of the limit delay time to be larger than an initial value when the shutter speed falls within the predetermined range.

20. An image blur prevention device for a camera, which can detect a camera shake, comprising:
means for setting a photographing operation mode of the camera;
means for detecting a focal length of a photographing lens;
means for determining a shutter speed of the camera;
a manual operating member for instructing a shift from a preparatory photographing operation to an exposure operation;
timer means for counting an elapsed time after said manual operating member is operated; and
control means for setting a limit delay time between the instant at which said manual operating member is operated and the instant at which an exposure operation is started, in accordance with at least one of the shutter speed, the focal length, and the photographing operation mode, and for starting an exposure operation after an operation of said manual operating member when said timer means finishes counting the limit delay time, or when a level of the shake state signal becomes not higher than a predetermined level.

21. A device according to claim 20, wherein the limit delay time is determined on the basis of one of a first time determined in accordance with a photographing operation mode, a second time set in accordance with a focal length, and at least one of maximum and minimum values of a third time set in accordance with a shutter speed.

22. A device according to claim 20, further comprising means for manually setting a default value of a limit delay time, and wherein when the default limit delay time is set, the limit delay time is determined in accordance with the default limit delay time.

23. An image blur prevention device for a camera, comprising:

shake detecting means for detecting a camera shake;

exposure instructing means for instructing the camera to perform film exposure;

first exposure permitting means for outputting a first exposure permission signal for permitting film exposure in accordance with the shake state;

second exposure permitting means for outputting a second exposure permission signal for permitting film exposure a predetermined time after an exposure instruction is output from said exposure instructing means; and control means for performing film exposure on the basis of at least one of an output from said exposure instructing means, an output from said first exposure permitting means, and an output from said second exposure permitting means.

24. A device according to claim 23, wherein said first exposure permitting means outputs the first exposure permission signal when a numerical value of the shake state is smaller than a predetermined value.

25. A device according to claim 23, wherein the first exposure permission signal is output when an image blur amount of an optical image formed on a film surface falls within a circle of confusion.

26. A device according to claim 23, wherein the second exposure permission signal is output on the basis of at least one of conditions of a focal length of a photographing lens, an exposure mode, a film feed mode, and a flash mode.

27. A device according to claim 23, wherein said control means performs film exposure in response to one of the first and second exposure permission signals which is output first, when an exposure instruction is output from said exposure instructing means.

28. An image blur prevention device for a camera, comprising:

means for outputting a first exposure signal when a shake becomes not more than a predetermined value after an exposure sequence start;

means for counting time in response to the exposure sequence start, and outputting a second exposure signal when a predetermined time has elapsed; and means for starting an exposure operation on the basis of at least one of the first and second exposure signals.

29. An image blur prevention device for a camera, comprising:

shake detecting means;

shake determining means for receiving an output from said shake detecting means and determining a level of a shake;

release operating means;

control means for controlling an exposure start timing on the basis of an output from said shake determining means and a state of said release operating means;

shutter means for performing an exposure operation in response to an output from said control means;

timer means for counting an elapsed time after said release operating means is operated;

setting means for setting a wait time between the instant at which said release operating means is operated and the instant at which said shutter means operates; and means for comparing the count result obtained by said timer means with the wait time set by said setting means, and determining an exposure start timing in accordance with the comparison result in preference to said control means.

* * * * *